(12) United States Patent
Ota et al.

(10) Patent No.: US 6,336,335 B2
(45) Date of Patent: Jan. 8, 2002

(54) ENGINE CONTROL APPARATUS OF VEHICLE HAVING AIR CONDITIONER

(75) Inventors: Masaki Ota; Kazuya Kimura; Masahiro Kawaguchi; Ken Suitou; Ryo Matsubara; Hirotaka Kurakake, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/745,571

(22) Filed: Dec. 21, 2000

(30) Foreign Application Priority Data

Dec. 24, 1999 (JP) .......................................... 11-368008

(51) Int. Cl.⁷ ................................................ B60H 1/32
(52) U.S. Cl. ........................ 62/133; 62/228.3; 62/229; 62/243; 123/339.17; 123/198 R
(58) Field of Search ................................. 62/133, 323.1, 62/323.4, 228.1, 228.3, 228.4, 228.5, 229, 243, 230, 215; 123/198 R, 339.17

(56) References Cited

U.S. PATENT DOCUMENTS

| | | | | |
|---|---|---|---|---|
| 5,018,362 A | * | 5/1991 | Nagase et al. ............ | 62/243 X |
| 5,199,272 A | * | 4/1993 | Yamanaka et al. ............ | 62/133 |
| 5,385,029 A | * | 1/1995 | Yamanaka et al. ..... | 62/323.1 X |
| 5,752,387 A | * | 5/1998 | Inagaki et al. ...... | 123/339.17 X |
| 6,035,652 A | * | 3/2000 | Hashimoto ......... | 123/339.17 X |

FOREIGN PATENT DOCUMENTS

JP          11-291751          10/1999

* cited by examiner

Primary Examiner—Harry B. Tanner
(74) Attorney, Agent, or Firm—Morgan & Finnegan, LLP

(57) ABSTRACT

An engine control apparatus of a vehicle having an air conditioner that has a variable displacement compressor is disclosed. The pressure difference between two points in a refrigeration circuit is monitored. The pressure difference represents the compressor displacement. The compressor is controlled by a control valve. The control valve operates based on the pressure difference. A controller compares the temperature of the passenger compartment with a temperature setting. If they differ, the controller determines a target pressure difference for the control valve. The controller computes the compressor torque based on the target pressure difference signal. The controller determines a target engine torque based on the compressor torque and controls the engine based on the target engine torque.

5 Claims, 7 Drawing Sheets

ENGINE CONTROL APPARATUS OF VEHICLE HAVING AIR CONDITIONER

BACKGROUND OF THE INVENTION

The present invention relates to an engine control apparatus of a vehicle having an air conditioner, and more particularly, to an engine control apparatus in a vehicle that has an air conditioner having a variable displacement compressor that is driven by a vehicle engine.

A vehicle air conditioner that predicts the actual torque of a compressor when the compressor is started based on a predetermined torque has been proposed. In the vehicle using the air conditioner, the engine is controlled to produce extra torque for driving the compressor.

If a variable displacement compressor is used, it is difficult to control the engine to produce an extra torque that is accurately corresponds to the torque required for driving the compressor.

The displacement of a variable displacement compressor corresponds to the torque of the compressor. The torque required to drive the compressor greatly varies between when the displacement is minimum and when the displacement is maximum. Therefore, if the compressor driving torque is predicted based on a predetermined fixed value, the predicted torque may be significantly different from the actual torque. As a result, starting the air conditioner while the vehicle is running may change the vehicle speed. Also, starting the air conditioner while the vehicle is accelerating may hinder the responsiveness of the vehicle.

SUMMARY OF THE INVENTION

Accordingly, in a vehicle that has an air conditioner having a variable displacement compressor driven by an engine, it is an objective of the present invention to provide an engine control apparatus that accurately predicts the driving torque of the variable displacement compressor.

To achieve the foregoing and other objectives and in accordance with the purpose of the present invention, an engine control apparatus of a vehicle having an air conditioner is provided. The air conditioner includes a variable displacement compressor, a pressure difference detection device, a control valve, a sensor and a temperature adjuster. The compressor is driven by the engine and includes a crank chamber and a cam plate accommodated in the crank chamber. The displacement of the compressor is varied by changing the pressure in the crank chamber. The compressor, together with the external refrigerant circuit, forms a refrigeration circuit. The pressure difference detection device detects the difference between the pressures at two pressure monitoring points, which are located in the refrigeration circuit. The pressure difference represents the displacement of the compressor. The control valve has a valve portion and a solenoid. The valve portion automatically adjusts its opening size based on the pressure difference detected by the pressure difference detection device. The solenoid changes a target pressure difference, which is used as a reference value for adjusting the opening size of the valve portion. The sensor outputs a signal that represents the temperature of the passenger compartment. The engine control apparatus includes a controller. The controller compares the signal from the sensor with a signal from the temperature adjuster. When the signals indicate a discrepancy, the controller sets a target pressure difference and sends a target pressure difference signal, which is based on the target pressure difference, to the solenoid such that the control valve operates at the target pressure difference. The controller computes the torque for driving the compressor based on the target pressure difference signal and determines a target engine torque based on the compressor driving torque. The controller controls the engine based on the target engine torque.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The drawings illustrate a vehicle air conditioner used in a vehicle having an engine control apparatus according to one embodiment of the present invention.

The air conditioner is used in a passenger car to cool the passenger compartment.

Figure 2:
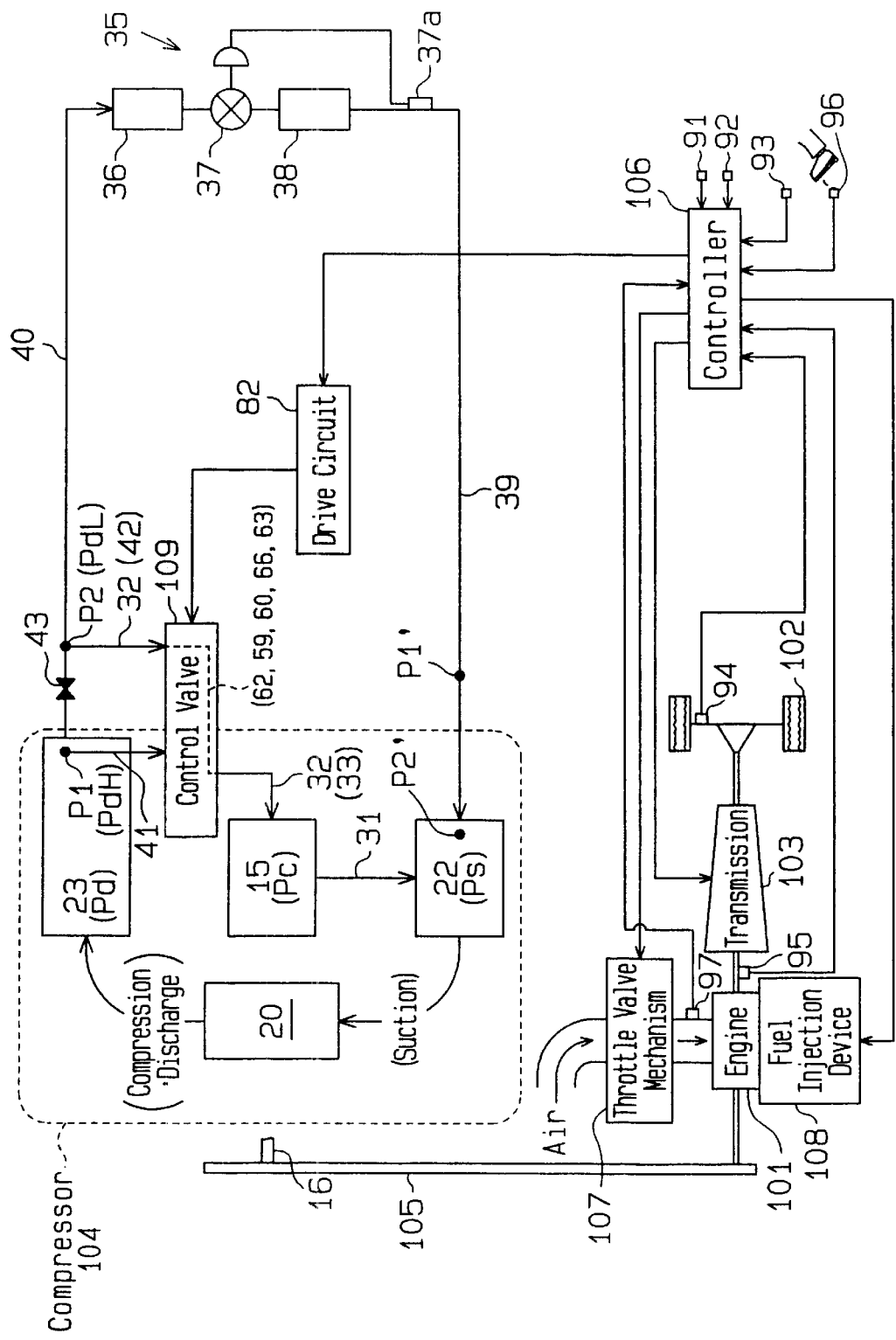
FIG. 2 is a schematic diagram illustrating the vehicle air conditioner having the variable displacement compressor of FIG. 1, the air conditioner being used in the vehicle having the engine control apparatus of the present invention.

As shown in FIG. 2, the air conditioner includes a variable displacement compressor 104, which is driven by an internal combustion engine 101. The engine 101 is, for example, a gasoline engine that includes a fuel injection device 108. The fuel injection device 108 injects fuel into a combustion chamber of the engine 101. A throttle valve mechanism 107 includes an actuator and a throttle valve located in an intake pipe of the engine 101. The actuator pivots the throttle valve in accordance with manipulation of a remote control device, which includes a pedal and a lever. The flow rate of air drawn into the engine 101 is controlled by changing the angle of the throttle valve. A transmission 103 is, for example, an automatic continuously variable transmission that includes a metal belt and variable diameter drive and driven pulleys. The transmission 103 also includes a drive circuit and an actuator. The drive circuit sends a signal to the actuator to change the effective diameter of the drive and driven pulleys, which changes the reduction ratio. The transmission 103, together with a propeller shaft and a differential, forms a driving mechanism. The input shaft of the transmission 103 is coupled to the engine 101. The output shaft of the transmission 103 is coupled to the differential and the rear wheels 102 through the propeller shaft.

The vehicle further includes auxiliary devices, which are driven by the engine 101, other than the compressor 104. For example, the vehicle includes a hydraulic pump of a power steering device (not shown).

Figure 1:
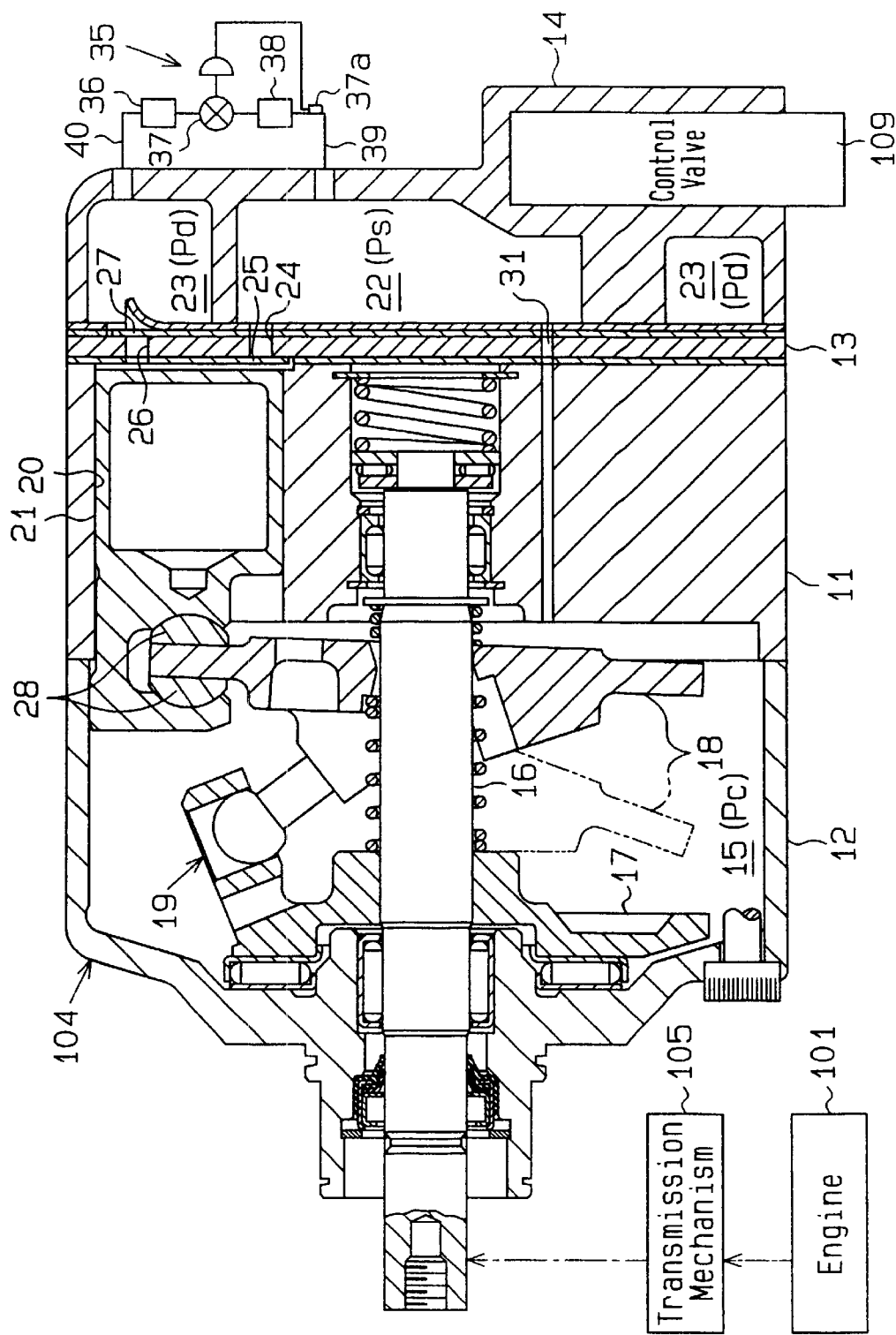
FIG. 1 is a cross-sectional view illustrating a variable displacement compressor of an air conditioner used in a vehicle that has an engine control apparatus according to the present invention.

As shown in FIG. 1, the compressor 104 includes a cylinder block 11, a front housing member 12, which is secured to the front end face of the cylinder block 11, and a rear housing member 14, which is secured to the rear end face of the cylinder block 11. A valve plate assembly 13 is located between the cylinder block 11 and the rear housing member 14. In FIG. 1, the left end of the compressor 104 is defined as the front end, and the right end of the compressor 104 is defined as the rear end.

A crank chamber 15 is defined between the cylinder block 11 and the front housing member 12. A drive shaft 16 extends through the crank chamber 15 and is supported by the cylinder block 11 and a front housing member 12.

The front end of the drive shaft 16 is connected to the engine 101 through a power transmission mechanism 105. The power transmission mechanism 105 includes a belt and a pulley. The mechanism 105 may be a clutch mechanism, such as an electromagnetic clutch, which is electrically controlled from the outside. In this embodiment, the mechanism 105 has no clutch mechanism. Thus, when the engine 101 is running, the compressor 104 is driven continuously.

A lug plate 17 is secured to the drive shaft 16 in the crank chamber 15. A drive plate, which is a swash plate 18 in this embodiment, is accommodated in the crank chamber 15. The swash plate 18 has a hole formed in the center. The drive shaft 16 extends through the hole in the swash plate 18. The swash plate 18 is coupled to the lug plate 17 by a hinge mechanism 19. The hinge mechanism 19 permits the swash plate 18 to rotate integrally with the lug plate 17 and drive shaft 16. The hinge mechanism 19 also permits the swash plate 18 to slide along the drive shaft 16 and to tilt with respect to a plane perpendicular to the axis of the drive shaft 16.

Several cylinder bores 20 (only one shown) are formed about the axis of the drive shaft 16 in the cylinder block 11. A single headed piston 21 is accommodated in each cylinder bore 20. Each piston 21 and the corresponding cylinder bore 20 define a compression chamber. Each piston 21 is coupled to the swash plate 18 by a pair of shoes 28. The swash plate 18 coverts rotation of the drive shaft 16 into reciprocation of each piston 21.

A suction chamber 22 and a discharge chamber 23 are defined between the valve plate assembly 13 and the rear housing member 14. The suction chamber 22 forms a suction pressure zone, the pressure of which is a suction pressure Ps. The discharge chamber 23 forms a discharge pressure zone, the pressure of which is a discharge pressure Pd. The valve plate assembly 13 has suction ports 24, suction valve flaps 25, discharge ports 26 and discharge valve flaps 27. Each set of the suction port 24, the suction valve flap 25, the discharge port 26 and the discharge valve flap 27 corresponds to one of the cylinder bores 20. When each piston 21 moves from the top dead center position to the bottom dead center position, refrigerant gas in the suction chamber 22 flows into the corresponding cylinder bore 20 via the corresponding suction port 24 and suction valve 25. When each piston 21 moves from the bottom dead center position to the top dead center position, refrigerant gas in the corresponding cylinder bore 20 is compressed to a predetermined pressure and is discharged to the discharge chamber 23 via the corresponding discharge port 26 and discharge valve 27.

The inclination angle of the swash plate 18 is determined according to the pressure in the crank chamber 15 (crank pressure Pc). The inclination angle of the swash plate 18 defines the stroke of each piston 21 and the displacement of the compressor 104.

As shown in FIGS. 1 and 2, the refrigerant circuit of the vehicle air conditioner includes the compressor 104 and an external refrigerant circuit 35, which is connected to the compressor 104. The external refrigerant circuit 35 includes a condenser 36, a temperature-type expansion valve 37 and an evaporator 38. The expansion valve 37 adjusts the flow rate of refrigerant supplied to the evaporator 38 based on the temperature or the pressure detected by a heat sensitive tube 37a, which is located downstream of the evaporator 38. The temperature or the pressure at the downstream of the evaporator 38 represents the thermal load on the evaporator 38. The external refrigerant circuit 35 includes a low pressure pipe 39, which extends from the evaporator 38 to the suction chamber 22 of the compressor 104, and a high pressure pipe 40, which extends from the discharge chamber 23 of the compressor 104 to the condenser 36.

The flow rate of the refrigerant in the refrigerant circuit is expressed by the product of the amount of the refrigerant gas discharged from the compressor 104 during one rotation of the drive shaft 16 multiplied by the rotational speed of the drive shaft 16. The speed of the drive shaft 16 is computed based on the speed of the engine 101 and the ratio of the speed of the drive shaft 16 to the speed of the engine 101. The speed ratio is determined by the power transmission mechanism 105. Under the condition where the engine 101 rotates at a constant rotational speed, the flow rate of the refrigerant in the refrigerant circuit increases as the compressor displacement increases when the inclination angle of the swash plate 18 increases. In other words, when the inclination angle of the swash plate 18 or the compressor displacement is constant, the flow rate of the refrigerant in the refrigerant circuit increases as the rotational speed Ne of the engine 101 increases. Detecting the flow rate of the refrigerant in the refrigerant circuit and the speed Ne of the engine 101 permits the displacement of the compressor 104, or the compressor driving torque Trcp, to be easily and accurately predicted.

Pressure loss in the refrigerant circuit increases as the flow rate of the refrigerant in the refrigerant circuit increases. If an upstream first pressure monitoring point and a downstream second pressure monitoring point are set up in the refrigerant circuit, the pressure difference between these two points due to the pressure loss shows a positive correlation with the flow rate of the refrigerant in the refrigerant circuit. Thus, the flow rate of the refrigerant in the refrigerant circuit can be detected indirectly by detecting the difference between the refrigerant gas pressure at the first pressure monitoring point and that at the second pressure monitoring point. In this embodiment, a first pressure monitoring point P1 is set up in the discharge chamber 23 corresponding to the most upstream section in the high pressure pipe 40, and a second pressure monitoring point P2 is set up in the high pressure pipe 40 at a predetermined distance downstream from the first point P1, as shown in FIG. 2. The refrigerant gas pressure at the first pressure monitoring point P1 and that at the second pressure monitoring point P2 are hereinafter referred to as PdH and PdL, respectively.

The compressor 104 has a crank pressure control mechanism for controlling the crank pressure Pc. As shown in FIGS. 1 and 2, the crank pressure control mechanism includes a bleed passage 31, a first pressure introduction passage 41, a second pressure introduction passage 42, a crank passage 33 and a control valve 109. The bleed passage 31 connects the crank chamber 15 to the suction chamber 22 to conduct refrigerant gas from the crank chamber 15 to the suction chamber 22. The first pressure introduction passage 41 connects the discharge chamber 23, i.e., the first pressure monitoring point P1, to the control valve 109. The second pressure introduction passage 42 connects the second pressure monitoring point P2 to the control valve 109. The crank passage 33 connects the control valve 109 to the crank chamber 15.

The second pressure introduction passage 42 and the crank passage 33 forms a supply passage 32 for connecting the second pressure monitoring point P2 to the crank chamber 15. The second pressure introduction passage 42 forms an upstream section of the supply passage 32, and the crank passage 33 forms a downstream section of the supply passage 32. The control valve 109 adjusts the flow rate of the high pressure refrigerant gas supplied from the second pressure monitoring point P2, through the supply passage 32, to the crank chamber 15 to control the crank pressure Pc.

As shown in FIG. 2, the high pressure pipe 40 is provided with a fixed restrictor 43 between the first pressure monitoring point P1 and the second pressure monitoring point P2. The fixed restrictor 43 increases the pressure difference (PdH–PdL) between the two pressure monitoring points P1 and P2. This enables the distance between the two pressure monitoring points P1 and P2 to be reduced and permits the second pressure monitoring point P2 to be relatively close to the compressor 104. Thus, the second pressure introduction passage 42, which extends from the second pressure monitoring point P2 to the control valve 109 in the compressor 104, can be shortened.

Figure 3:
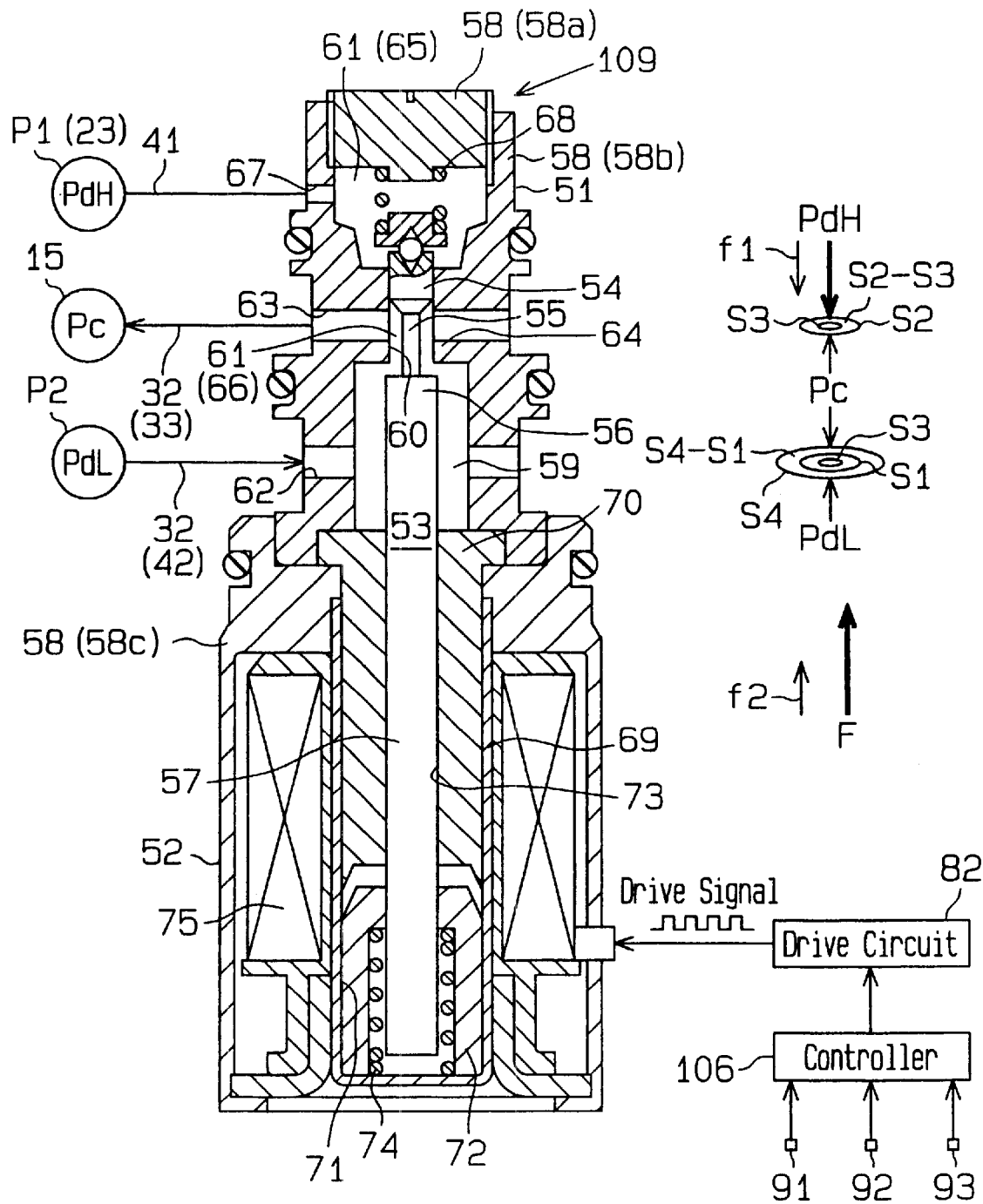
FIG. 3 is a cross-sectional view illustrating a control valve used in the variable displacement compressor shown in FIG. 1.
Figure 4:
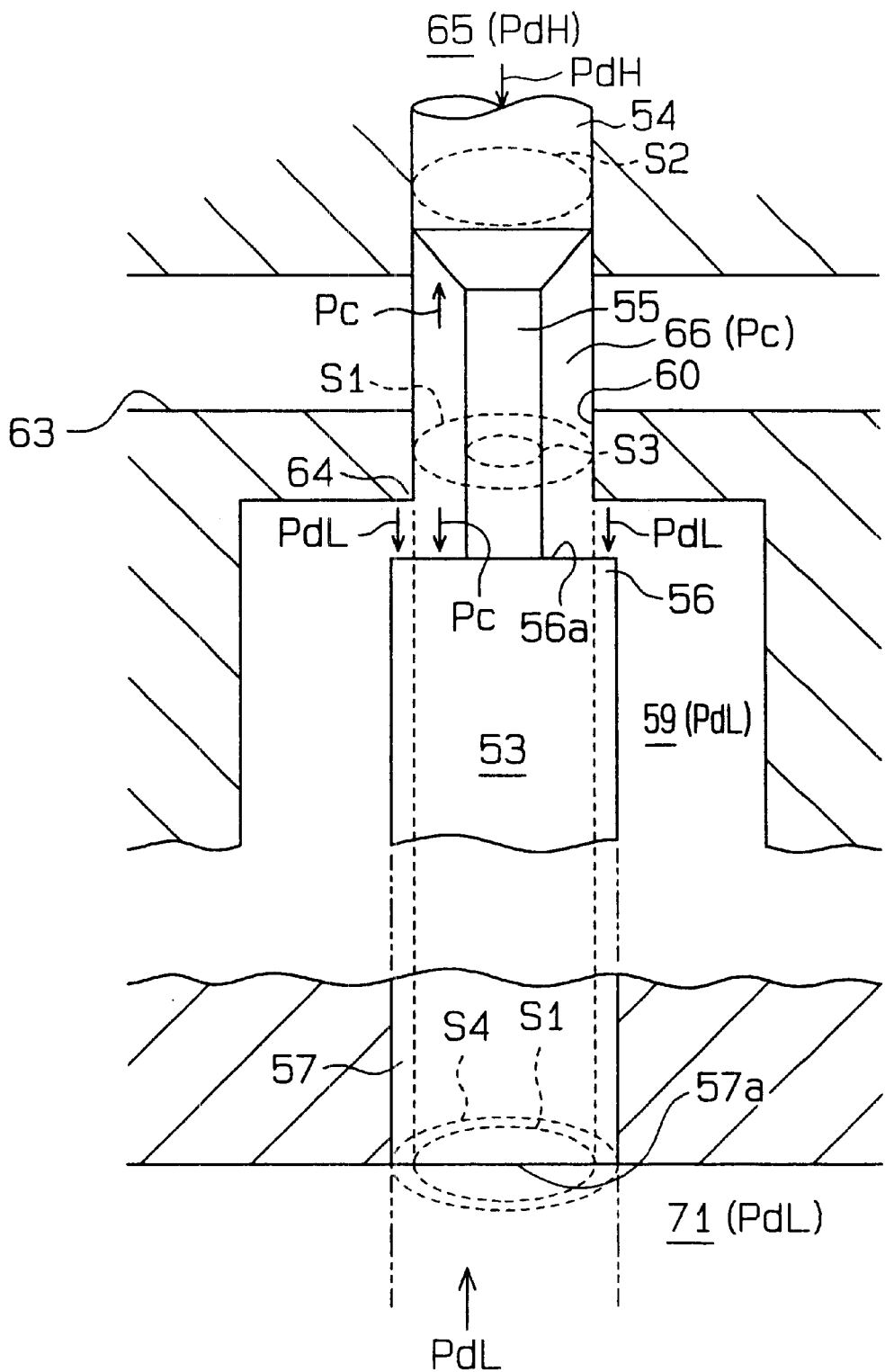
FIG. 4 is a schematic cross-sectional view showing part of the control valve shown in FIG. 3.

As shown in FIG. 1, the control valve 109 is fitted in a receiving hole of the rear housing member 14. As shown in FIGS. 3 and 4, the control valve 109 is provided with an inlet valve mechanism 51 and a solenoid 52, which serves as an electromagnetic actuator. The inlet valve mechanism 51 adjusts the aperture of the supply passage 32. The solenoid 52 exerts a force according to the level of the electric current supplied from the outside to the inlet valve mechanism 51 through an operating rod 53. The operating rod 53 is cylindrical and has a divider 54, a coupler 55 and a guide 57. The part of the guide 57 adjacent to the coupler 55 functions as a valve body 56. The cross-sectional area S3 of the coupler 55 is smaller than the cross-sectional area S4 of the guide 57 and the valve body 56.

The control valve 109 has a valve housing 58 containing an upper housing member 58b and a lower housing member 58c. The upper housing member 58b constitutes a shell for the inlet valve mechanism 51, and the lower housing member 58c constitutes a shell for the solenoid 52. A plug 58a is screwed into the upper housing member 58b to close an opening in its upper end. A valve chamber 59 and a through hole 60 connected thereto are defined in the upper housing member 58b. The through hole 60 has a constant cross-sectional area in the axial direction. The upper housing member 58b and the plug 58a define a high pressure chamber 65. The high pressure chamber 65 and the valve chamber 59 communicate with each other through the through hole 60. The operating rod 53 extends through the valve chamber 59, the through hole 60 and the high pressure chamber 65. The operating rod 53 moves axially such that the valve body 56 selectively connects and blocks off the valve chamber 59 with respect to the through hole 60.

A first radial port 62 is formed in the upper housing member 58b to communicate with the valve chamber 59.

The valve chamber 59 is connected to the second pressure monitoring point P2 through the first port 62 and the second pressure introduction passage 42. Thus, the pressure PdL at the second pressure monitoring point P2 exerts to the inside of the valve chamber 59 through the second pressure introduction passage 42 and the first port 62. A second port 63 extending radially is formed in the upper housing member 58b to communicate with the through hole 60. The through hole 60 is connected to the crank chamber 15 through the second port 63 and the crank passage 33. When the valve body 56 opens to connect the valve chamber 59 to the through hole 60, the refrigerant gas is supplied from the second pressure monitoring point P2, through the supply passage 32, which includes the second pressure introduction passage 42 and the crank passage 33, into the crank chamber 15. The ports 62 and 63, the valve chamber 59 and the through hole 60 constitute a part of the supply passage 32 within the control valve 109.

The valve body 56 is located in the valve chamber 59. The cross-sectional area S3 of the coupler 55 is less than the cross-sectional area S1 of the through hole 60. The cross-sectional area S1 of the through hole 60 is less than the cross-sectional area S4 of the valve body 56. The inner wall of the valve chamber 59, to which the through hole 60 opens, functions as a valve seat 64 for receiving the valve body 56. The through hole 60 functions as a valve opening, which is opened and closed selectively by the valve body 56. When the valve body 56 is abutted against the valve seat 64, the through hole 60 is shut off from the valve chamber 59. As shown in FIG. 3, when the valve body 56 is spaced from the valve seat 64, the through hole 60 is connected to the valve chamber 59.

The divider 54 of the operating rod 53 has a portion located in the through hole 60 and a portion located in the high pressure chamber 65. The cross-sectional area S2 of the divider 54 is equal to the cross-sectional area S1 of the through hole 60. Therefore, the divider 54 shuts off the high pressure chamber 65 from the valve chamber 59.

In FIGS. 3 and 4, the lower portion of the divider 54 that corresponds to the through hole define a pressure chamber 66. The pressure chamber 66 is connected to the crank chamber Pc through the second port 63. The high pressure chamber 65 and the pressure chamber 66, which are disconnected by the divider, form a pressure sensing chamber 61.

A third radial port 67 is defined in the upper housing member 58b to communicate with the high pressure chamber 65. The high pressure chamber 65 is connected through the third port 67 and the first pressure introduction passage 41 to the first pressure monitoring point P1 or the discharge chamber 23. Thus, the pressure PdH at the first pressure monitoring point P1 is exerted through the first pressure introduction passage 41 and the third port 67 to the high pressure chamber 65.

A return spring 68 is contained in the high pressure chamber 65. The return spring 68 urges the operating rod 53 to cause the valve body 56 to move away from the valve seat 64.

The solenoid 52 is provided with a cup-shaped receiving cylinder 69, which is fixed in the lower housing member 58c. A fixed iron core 70 is fitted in the upper opening of the receiving cylinder 69. The fixed iron core 70 constitutes a part of the inner wall of the valve chamber 59 and also defines a plunger chamber 71. A plunger 72 is located in the plunger chamber 71. The fixed iron core 70 includes a guide hole 73, which accommodates the guide 57 of the operating rod 53. A slight clearance (not shown) exists between the inner wall of the guide hole 73 and the guide 57. The valve chamber 59 and the plunger chamber 71 communicate normally with each other through the clearance. Thus, the pressure in the valve chamber 59, or the pressure PdL at the second pressure monitoring point P2, is applied inside the plunger chamber 71.

The lower end of the guide 57 extends into the plunger chamber 71. The plunger 72 is fixed to the lower end of the guide 57. The plunger 72 moves in the axial direction integrally with the operating rod 53. A shock absorbing spring 74 is contained in the plunger chamber 71 to urge the plunger 72 toward the fixed iron core 70.

A coil 75 surrounds the fixed iron core 70 and the plunger 72. A controller 106 supplies electric power to the coil 75 through a drive circuit 82. The coil 75 then generates an electromagnetic force F between the fixed iron core 70 and the plunger 72 corresponding to the level of the electric power supplied to the coil 75. The electromagnetic force F attracts the plunger 72 toward the fixed iron core 70 and urges the operating rod 53 to cause the valve body 56 to move toward the valve seat 64.

The force of the shock absorbing spring 74 is smaller than the force of the return spring 68. Therefore, the return spring 68 moves the plunger 72 and the operating rod 53 to the initial position as shown in FIG. 3 when no power is supplied to the coil 75, and the valve body 56 is moved to the lowest position to maximize the opening size of the through hole 60.

There are methods for changing voltage applied to the coil 75, one of which is to change the voltage value and another is referred to as PWM control or duty control. Duty control is employed in this embodiment. Duty control is a method where the ON-time per cycle of a pulsed voltage, which is turned on and off periodically, is adjusted to modify the average value of the voltage applied. An average applied voltage value can be obtained by multiplying the value obtained by dividing the ON-time of the pulsed voltage by the cycle time thereof, i.e., the duty ratio Dt, by the pulsed voltage value. In duty control, the electric current varies intermittently. This reduces hysteresis of the solenoid 52. The smaller the duty ratio Dt is, the smaller the electromagnetic force F generated between the fixed iron core 70 and the plunger 72 is and the greater the opening size of the through hole 60 by the valve body 56 is. It is also possible to measure the value of the electric current flowing through the coil 75 and perform feed back control of the value of the voltage applied to the coil 75.

The opening size of the through hole 60 by the valve body 56 depends on the axial position of the operating rod 53. The axial position of the operating rod 53 is determined based on various forces that act axially on the operating rod 53. These forces will be described referring to FIGS. 3 and 4. The downward forces in FIGS. 3 and 4 tend to space the valve body 56 from the valve seat 64 (the valve opening direction). The upward forces in FIGS. 3 and 4 tend to move the valve body 56 toward the valve seat 64 (the valve closing direction).

First, the various forces acting on the portion of the operating rod 53 above the coupler 55, i.e., on the divider 54, will be described. As shown in FIGS. 3 and 4, the divider 54 receives a downward force f1 from the return spring 68. The divider 54 also receives a downward force based on the pressure PdH in the high pressure chamber 65. The effective pressure receiving area of the divider 54 with respect to the pressure PdH in the high pressure chamber 65 is equal to the cross-sectional area S2 of the divider 54. The divider 54 also receives an upward force based on the pressure in the through hole 60 (crank pressure Pc). The effective pressure receiving area of the divider 54 with respect to the pressure in the through hole 60 is equal to the cross-sectional area S2 of the divider 54 minus the cross-sectional area S3 of the coupler 55. Provided that the downward forces are positive values, the net force $\Sigma F1$ acting upon the divider 54 can be expressed by the following equation I.

$$\Sigma F1 = PdH \cdot S2 - Pc(S2-S3) + f1 \qquad \text{Equation I}$$

Next, various forces that act upon the portion of the operating rod 53 below the coupler 55, i.e., on the guide 57, will be described. The guide 57 receives an upward force f2 from the shock absorbing spring 74 and an upward electromagnetic force F from the plunger 72. Further, as shown in FIG. 4, the end face 56a of the valve body 56 is divided into a radially inner portion and a radially outer portion by an imaginary cylinder, which is shown by broken lines in FIG. 4. The imaginary cylinder corresponds to the wall defining the through hole 60. The pressure receiving area of the radially inner portion is expressed by S1–S3, and that of the radially outer portion is expressed by S4–S1. The radially inner portion receives a downward force based on the pressure in the through hole 60 (crank pressure Pc). The radially outer portion receives a downward force based on the pressure PdL in the valve chamber 59.

As described above, the pressure PdL in the valve chamber 59 is applied to the plunger chamber 71. The upper surface of the plunger 72 has a pressure receiving area that is equal to that of the lower surface, and the forces that act on the plunger 72 based on the pressure PdL offset each other. However, the lower end face 57a of the guide 57 receives an upward force based on the pressure PdL in the plunger chamber 71. The effective pressure receiving area of the lower end face 57a is equal to the cross-sectional area S4 of the guide 57. Provided that the upward forces are positive values, the net force $\Sigma F2$ acting upon the guide 57 can be expressed by the following equation II.

$$\Sigma F2 = F + f2 - Pc(S1-S3) - PdL(S4-S1) + PdL \cdot S4 = F + f2 + PdL \cdot S1 - Pc(S1-S3) \qquad \text{Equation II}$$

In the process of simplifying equation II, –PdL·S4 is canceled by +PdL·S4, and the term +PdL·S1 remains. Thus, the resultant of the downward force based on the pressure PdL acting upon the guide 57 and the upward force based on the pressure PdL acting upon the guide 57 is a net upward force, and the magnitude of this resultant force depends only on the cross-sectional area S1 of the through hole 60. The surface area of the portion of the guide 57 that receives the pressure PdL with effect, i.e., the effective pressure receiving area of the guide 57 with respect to the pressure PdL, is always equal to the cross-sectional area S1 of the through hole 60 regardless of the cross-sectional area S4 of the guide 57.

The axial position of the operating rod 53 is determined such that the force $\Sigma F1$ in the equation I and the force $\Sigma F2$ in the equation II are equal. When the force $\Sigma F1$ is equal to the force $\Sigma F2$ ($\Sigma F1 = \Sigma F2$), the following equation III is satisfied.

$$PdH \cdot S2 - PdL \cdot S1 - Pc(S2-S1) = F - f1 + f2 \qquad \text{Equation III}$$

The cross-sectional area S1 of the through hole 60 is equal to the cross-sectional area S2 of the divider 54. Therefore, if S2 is replaced with S1 in equation III, the following equation IV is obtained.

$$PdH - PdL = (F - f1 + f2)/S1 \qquad \text{Equation IV}$$

In equation IV, f1, f2 and S1 are determined by the design of the control valve 109. The electromagnetic force F is a variable parameter that changes depending on the power supplied to the coil 75. The equation IV shows that the operating rod 53 operates to change the pressure difference (PdH−PdL) in accordance with the change in the electromagnetic force F. In other words, the operating rod 53 operates in accordance with the pressure PdH and the pressure PdL, which act on the rod 53, such that the pressure difference (PdH−PdL) seeks a target value, which is determined by the electromagnetic force F. The operating rod 53 functions as a pressure detecting body or a pressure receiving body.

As described above, the downward force f1 of the return spring 68 is greater than the upward force f2 of the shock absorbing spring 74. Therefore, when no voltage is applied to the coil 75, or when the electromagnetic force F is nil, the operating rod 53 moves to the initial position shown in FIG. 3 to maximize the opening size of the through hole 60 by the valve body 56.

When the duty ratio Dt of the voltage applied to the coil 75 is the minimum value Dt(min) in a preset range, the upward electromagnetic force F exceeds the downward force f1 of the return spring 68. The upward urging force F and the upward force f2 of the shock absorbing spring 74 compete with the downward force f1 of the return spring 68 and the downward force based on the pressure difference (PdH−PdL). The operating rod 53 operates to satisfy the above equation IV to determine the position of the valve body 56 with respect to the valve seat 64. Then, refrigerant gas is supplied, from the second pressure monitoring point P2, through the supply passage 32 to the crank chamber 15 at a flow rate that depends on the valve position of the valve body 56, to adjust the crank pressure Pc.

The controller 106 forms a part of the engine control apparatus and includes a microprocessor, a read only memory, a random access memory, an input-output interface. The input-output interface is connected to a switch 91 for turning the air conditioner on and off, a compartment temperature adjuster 93 for setting a target compartment temperature Te(set) in the passenger compartment and other sensors. The sensors include a compartment temperature sensor 92 for detecting the temperature in the passenger compartment, a sensor 94 located on an axle for detecting the vehicle speed, a rotation speed sensor 95 for detecting a speed Ne of the crankshaft of the engine 101, an acceleration pedal sensor 96 for detecting the depression degree Acc of the acceleration pedal and an intake pressure sensor 97 for detecting the pressure R of air drawn into the engine 101.

The input-output interface of the controller 106 is connected to the drive circuit 82 for exciting the coil 75 of the control valve 109, a drive circuit for changing the ratio of the automatic transmission 103, a circuit for actuating the valve of the throttle valve mechanism 107 and a circuit for actuating the fuel injection device 108.

The controller 106 determines the duty ratio Dt of a signal sent to the drive circuit 82 of the control valve 109 based on the ON/OFF state of the switch 91, the temperature Te(t) detected by the compartment temperature sensor 92 and the target temperature Te(set) set by the compartment temperature adjuster 93.

The controller 106 computes a target torque Trk of the engine 101 based on the pedal depression degree Acc detected by the pedal sensor 96, the speed Ne of the crankshaft detected by the speed sensor 95, and the duty ratio Dt sent to the control valve 109 from the drive circuit 82.

The controller 106 determines a target throttle opening size based on the computed target engine torque Trk and sends the target throttle opening size to the drive circuit of the throttle valve mechanism 107. The drive circuit of the mechanism 107 actuates the throttle valve to obtain the target opening size. The flow rate of air drawn into the engine 101 is changed, accordingly.

The controller 106 computes a target fuel injection amount based on the pressure of intake air detected by the intake air pressure sensor 97 and the stoichiometric air-fuel ratio. The intake air pressure corresponds to the flow rate of the intake air. The controller 106 sends the target fuel injection amount to the drive circuit of the fuel injection device 108. The fuel injection device 108 injects fuel, the amount of which corresponds to the stoichiometric ratio into the engine combustion chamber during the suction stroke of each engine piston.

Figure 7:
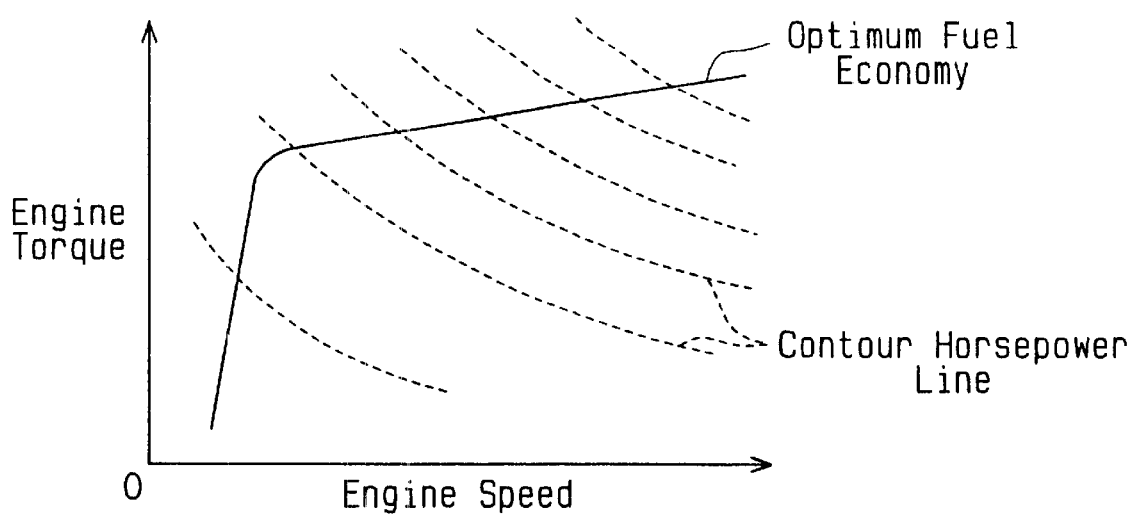
FIG. 7 is a graph showing the relationship between the engine speed and the engine torque.

The controller 106 determines a target value of the engine speed Ne based on the target engine torque Trk referring to the optimum fuel economy line in the graph of FIG. 7. The controller 106 then computes a target gear ratio of the automatic transmission 103 based on the target value of the engine speed Ne and the vehicle speed detected by the vehicle speed sensor 94 and sends the target gear ratio to the drive circuit of the transmission 103. The drive circuit of the transmission 103 adjusts the pulley ratio between the drive pulley and the driven pulley accordingly such that the speed Ne of the engine crankshaft matches the target value. The engine 101 runs at the engine speed Ne and a torque that corresponds to the optimum fuel economy. That is, the engine 101 operates on the optimum fuel economy line in FIG. 7. The operation of the controller 106 will be described below.

The air conditioner is started when the vehicle ignition switch or the start switch is turned on. When the ignition switch or the start switch is turned on, the controller 106 receives electricity from a vehicle battery and starts operating.

Figure 5:
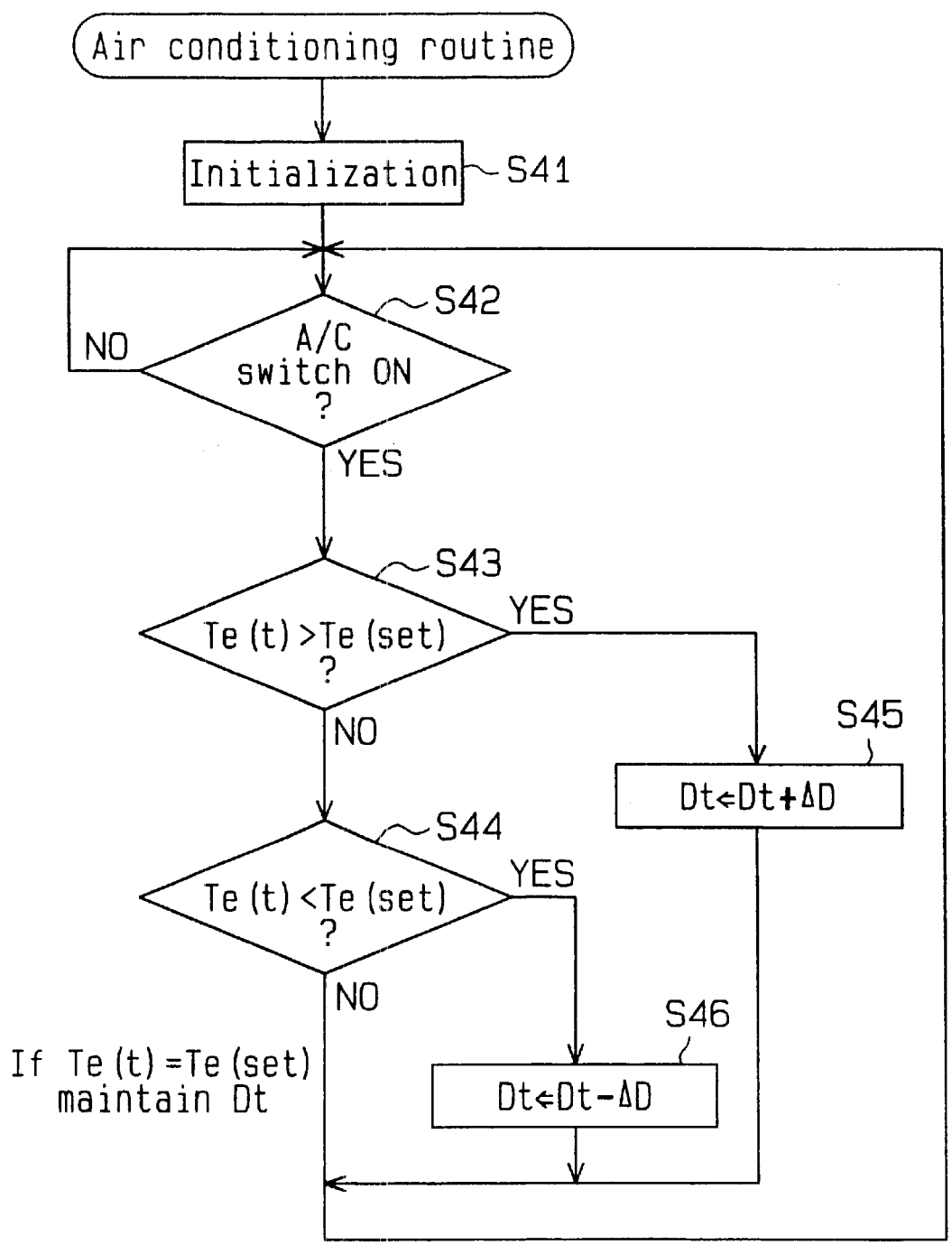
FIG. 5 is a flowchart showing a main routine for controlling the air conditioner of FIG. 2.

The flowchart of FIG. 5 shows the main routine for controlling the compressor displacement. When the vehicle ignition switch or the starting switch is turned on, the controller 106 starts processing. The controller 106 performs various initial setting in step S41. For example, the controller 106 assigns predetermined initial value (0%) to the duty ratio Dt of the voltage applied to the coil 75.

In step S42, the controller 106 waits until the air conditioner switch 91 is turned on. When the air conditioner switch 91 is turned on, the controller 106 moves to step S43. In step S43, the controller 106 judges whether the temperature Te(t), which is detected by the temperature sensor 92, is higher than a desired temperature Te(set), which is set by the temperature adjuster 93. If the outcome of step S43 is negative, the controller 106 moves to step S44. In step S44, the controller 106 judges whether the temperature Te(t) is lower than the desired temperature Te(set). If the outcome in step S44 is also negative, the controller 106 judges that the detected temperature Te(t) is equal to the desired temperature Te(set) and returns to step S42 without changing the current duty ratio Dt.

If the outcome of step S43 is positive, the controller 106 moves to step S45 for increasing the cooling performance of the refrigerant circuit. In step S45, the controller 106 adds a predetermined value ΔD to the current duty ratio Dt and sets the resultant as a new duty ratio Dt. The controller 106 sends the new duty ratio Dt to the drive circuit 82. Accordingly, the electromagnetic force F of the solenoid 52 is increased by an amount that corresponds to the value ΔD, which moves the rod 53 in the valve closing direction. As the rod 53 moves, the force f1 of the return spring 68 is increased. The axial position of the rod 53 is determined such that equation IV is satisfied.

As a result, the opening size of the control valve 109 is decreased and the crank pressure Pc is lowered. Thus, the inclination angle of the swash plate 18 and the compressor displacement are increased. An increase of the compressor displacement increases the flow rate of refrigerant in the refrigerant circuit and increases the cooling performance of the evaporator 38. Accordingly, the temperature Te(t) is lowered to the desired temperature Te(set) and the pressure difference (PdH−PdL) is increased.

If the outcome of S44 is positive, the controller 106 moves to step S46 for decreasing the cooling performance of the refrigerant circuit. In step S46, the controller 106 subtracts the predetermined value ΔD from the current duty ratio Dt and sets the resultant as a new duty ratio Dt. The controller 106 sends the new duty ratio Dt to the drive circuit 82. Accordingly, the electromagnetic force F of the solenoid 52 is decreased by an amount that corresponds to the value ΔD, which moves the rod 53 in the valve opening direction. As the rod 53 moves, the force f1 of the return spring 68 is decreased. The axial position of the rod 53 is determined such that equation IV is satisfied.

As a result, the opening size of the control valve 109 is increased and the crank pressure Pc is raised. Thus, the inclination angle of the swash plate 18 and the compressor displacement are decreased. A decrease of the compressor displacement decreases the flow rate of refrigerant in the refrigerant circuit and decreases the cooling performance of the evaporator 38. Accordingly, the temperature Te(t) is raised to the desired temperature Te(set) and the pressure difference (PdH−PdL) is decreased.

As described above, the duty ratio Dt is optimized in steps S45 and S46 such that the detected temperature Te(t) seeks the desired temperature Te(set).

Figure 6:
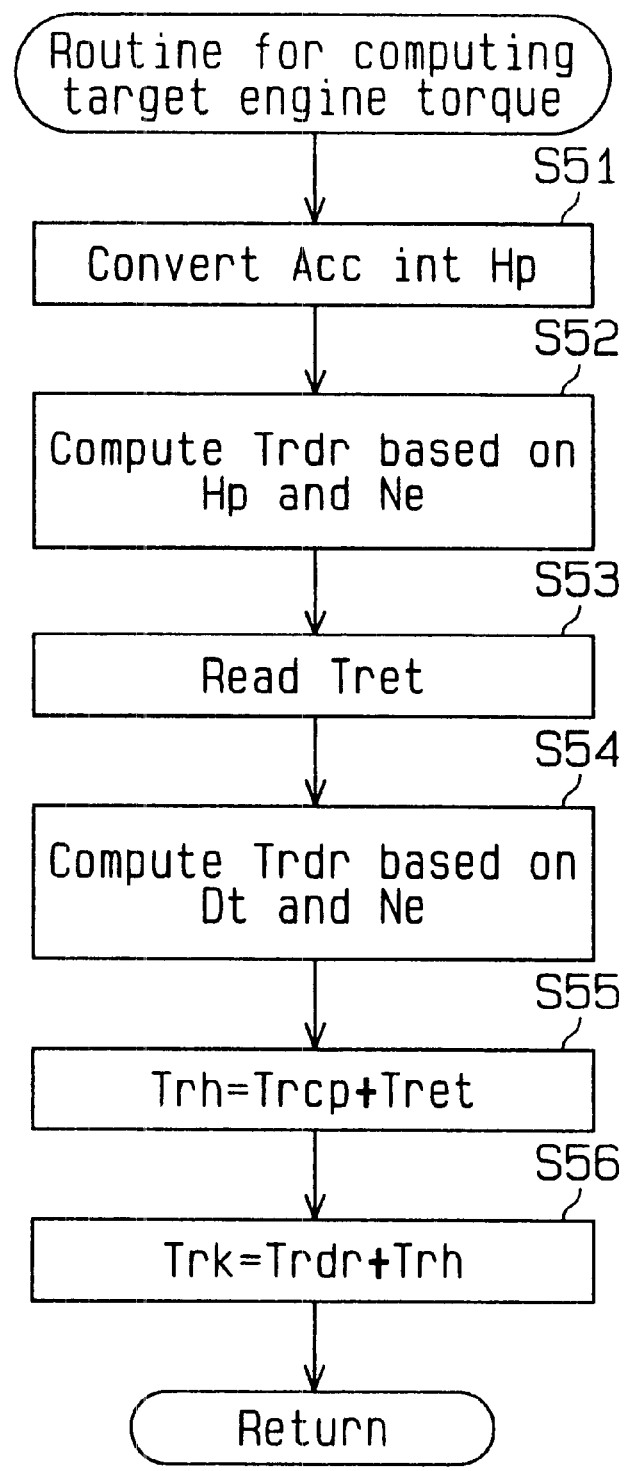
FIG. 6 is a flowchart showing a routine for computing a target engine torque.

After adding the value ΔD to the duty ratio Dt in step S45, the controller 106 starts computing the target torque of the engine 101 in step S51 in a routine of FIG. 6. At step S46, the controller 106 subtracts the value ΔD from the duty ratio Dt. At this time, the controller 106 also starts computing the target torque of the engine 101 in step S51.

In step S51, the controller 106 converts the pedal depression degree Acc detected by the pedal sensor 96 into the demanded horse power Hp of the engine 101 by referring to a conversion table and moves to step S52. In step S52, the controller computes the demanded torque Trdr of the engine 101 based on the demanded horsepower Hp and the speed Ne detected by the speed sensor 95 and moves to step S53. In step S53, the controller 106 reads the required torque Tret for actuating auxiliary devices other than the compressor 104 from a table and moves to step S54. The auxiliary devices include, for example, the hydraulic pump of a power steering device.

In step S54, the controller 106 computes the torque Trcp for driving the compressor 104 based on the engine speed Ne and the duty ratio Dt, which has been computed by adding the value ΔD to or subtracting the value ΔD from the previous duty ratio Dt.

As described above, the duty ratio Dt determines the amount of refrigerant per unit time supplied from the compressor 104 to the external refrigerant circuit 35. Thus, the controller 106 computes the flow rate of refrigerant in the refrigerant circuit by referring to a conversion table that represents the relationship between the duty ratio and the refrigerant flow rate. The speed of the compressor drive shaft 16 is computed based on the engine speed Ne and the reduction ratio of the power transmission mechanism 105. Thus, the controller 106 divides the flow rate of refrigerant in the refrigerant circuit by the speed of the compressor drive shaft 16 to compute the amount of discharged refrigerant per unit rotation of the drive shaft 16. In other words, the controller 106 computes the amount of refrigerant discharged from the compressor 104 to the external refrigerant circuit 35. Then, the controller 106 converts the displacement of the compressor 104 to the torque Trcp for driving the compressor 104 by referring to a table. After computing the compressor torque Trcp, the controller 106 moves to step S55.

The controller 106 computes the torque of the auxiliary devices Trh by adding the compressor torque Trcp computed in step S55 to the torque Tret of the other auxiliary devices and moves to step S56. In step S56, the controller 106 computes a target engine torque Trk by adding the auxiliary device torque Trh to the demanded engine torque Trdr, which is computed in step S52.

After computing the target engine torque Trk, the controller 106 determines a target throttle opening size according to the target engine torque Trk and commands the throttle valve mechanism 107 to open the throttle accordingly. The throttle valve mechanism 107 adjusts the amount of intake air drawn into the engine 101. Accordingly, the engine 101 runs with the throttle opening size adjusted to the target size.

The controller 106 determines a target value of the engine speed Ne based on the target engine torque Trk referring to the table of FIG. 7. The controller 106 computes a target gear ratio of the automatic transmission 103 based on the target value of the engine speed Ne and the vehicle speed detected by the vehicle speed sensor 94 and sends the target gear ratio to the automatic transmission 103. The drive circuit of the transmission 103 changes the gear ratio between the drive pulley and the driven pulley to match the engine speed Ne to the target value. The vehicle runs at a torque and the engine speed Ne that correspond to the optimum fuel economy while the air conditioner continues to operate.

Thereafter, the controller 106 executes steps S41 and S43 of FIG. 5. If the detected temperature Te(t) is lower than the target temperature Te(set), the controller 106 changes the duty ratio to change the target engine torque Trk according to the routine of FIG. 6. Accordingly, the reduction ratio of the transmission 103 is changed. If the detected temperature Te(t) is higher than the target temperature Te(set), the controller 106 also changes the target engine torque TrK according to the routine of FIG. 6 to change the reduction ratio of the transmission 103.

The engine control apparatus of the present invention has the following advantages.

(1) When computing the target torque Trk of the engine 101, the controller 106 predicts the torque Trcp of the compressor 104 based on the duty ratio Dt, which is used for controlling the control valve 109, or for controlling the air conditioner. Thus, the difference between the predicted torque and the actual torque required for driving the compressor 104 is less than that of prior art air conditioners, which use a fixed value of the compressor driving torque.

(2) The controller 106 computes the flow rate of refrigerant in the refrigerant circuit based on the target value of the pressure difference and divides the computed flow rate by the speed of the compressor to compute the amount of refrigerant discharged by the compressor 104 per rotation of the drive shaft 16. The controller 106 determines the compressor driving torque Trcp based on the compressor displacement per rotation. Then, the controller 106 determines the horsepower Hp required for the engine 101 based on the depression degree Acc of the acceleration pedal and computes the required engine torque Trdr based on the required horsepower Hp and the engine speed Ne. The controller 106 adds the required engine torque Trdr to the compressor torque Trcp to determine the target engine torque Trk. The controller 106 controls the engine 101 based on the target engine torque Trk. The target engine torque Trk is accurately computed, which permits the engine 101 to be accurately controlled.

(3) When computing the target engine torque Trk, the controller 106 adds not only the torque for driving the compressor 104 but also the torque for driving the other auxiliary devices to the torque Trdr, which is required for moving the vehicle. Therefore, if the engine 101 is driving an auxiliary device other than the compressor 104, such as a hydraulic pump of a power steering device, the engine 101 is accurately controlled.

(4) The controller 106 actuates the throttle valve mechanism 107 according to the target engine torque Trk so that the flow rate of air drawn into the engine 101 corresponds to the target engine torque Trk. Also, the controller 106 determines the target value of the engine speed Ne based on the target engine torque Trk by referring to the optimum fuel economy line in the graph of FIG. 7. The controller 106 computes the target reduction ratio of the transmission 103 based on the target value of the engine speed Ne and the current vehicle speed. Then, the controller 106 controls the transmission 103 to operate at the target reduction ratio. The engine 101 thus runs at the optimum fuel economy.

(5) The control valve 109 computes the target value of the pressure difference (PdH−PdL) between the pressure monitoring points P1, P2, or the target value of the refrigerant flow rate in the refrigerant circuit, based on the duty ratio Dt sent from the controller 106. The compressor displacement is controlled such that the current flow rate seeks the target flow rate. Therefore, the controller 106 computes the refrigerant flow rate based on the duty ratio Dt and computes the compressor displacement based on the flow rate and the engine speed Ne. The compressor displacement is thus accurately determined.

(6) The control valve 109 automatically adjusts its opening size based on the pressure difference (PdH−PdL) between the pressure monitoring points P1, P2. Therefore, the air conditioner requires no electronic elements such as pressure sensors for detecting the pressures at the pressure monitoring points P1, P2. Also, the program for controlling the control valve 109 is simplified.

It should be apparent to those skilled in the art that the present invention may be embodied in many other specific forms without departing from the spirit or scope of the invention. Particularly, it should be understood that the invention may be embodied in the following forms.

In the illustrated embodiment, the engine torque is adjusted by changing the throttle opening size, or the flow rate of the intake air, based on the target engine torque Trk to run the engine 101 at the stoichiometric air fuel ratio. However, the engine torque may be controlled in other ways. For example, the throttle valve opening size may be constant and the fuel injection device 108 may be directly controlled based on the engine target torque Trk such that the fuel ratio is lean. Alternatively, the engine torque may be changed by adjusting the fuel injection timing, which is not directly related to the fuel injection amount, or by selecting the combustion mode from homogeneous combustion and stratified charge combustion. Further, the engine torque may be changed by the opening timing or the valve lift of at least one of the intake valve and the exhaust valve. Also, the engine torque may be changed by altering the ignition timing.

The automatic transmission 103 may be replaced with an automatic transmission having another construction, such as a toroidal transmission.

The compressor 104, which includes the swash plate 18, may be replaced by a wobble plate type variable displacement compressor.

In the illustrated embodiment, the first pressure monitoring point P1 is located in the discharge chamber 23 and the second pressure monitoring point P2 is located in the high pressure pipe 40 at a location that is separated from the first pressure monitoring point P1 by a predetermined distance. However, the pressure monitoring points P1, P2 need not be located in the high pressure zone in the refrigerant circuit.

The first pressure monitoring point P1 may be moved to a position indicated by P1' in FIG. 2, which is between the evaporator 38 and the suction chamber 22, and the second pressure monitoring point P2 may be moved to a position indicated by P2' in FIG. 2, which is located downstream of the position P1', for example, in the suction chamber 22.

Alternatively, the first pressure monitoring point P1 may be located between the discharge chamber 23 and the condenser 36, and the second pressure monitoring point P2 may be located between the evaporator 38 and the suction chamber 22.

Further, the first pressure monitoring point P1 may be located between the discharge chamber 23 and the condenser 36, and the second pressure monitoring point P2 may be located in the crank chamber 15.

The first pressure monitoring point P1 may be located in the crank chamber 15 and the second pressure monitoring point P2 may be located between the evaporator 38 and the suction chamber 22.

The control valve 109 may be replaced by an ordinary electromagnetic valve, which is actuated only electromagnetically, and the pressures at the monitoring points P1, P2 may be detected by two pressure sensors. In this case, the controller 106 controls the electromagnetic valve based on signals from the pressure sensors.

The crank pressure Pc may be controlled by changing the opening size of the bleed passage 31 when necessary. Further, the crank pressure Pc may be controlled by changing both opening size of the supply passage 32 and the bleed passage 31.

Therefore, the present examples and embodiments are to be considered as illustrative and not restrictive and the invention is not to be limited to the details given herein, but may be modified within the scope and equivalence of the appended claims.

What is claimed is:

1. An engine control apparatus of a vehicle having an air conditioner, wherein the air conditioner includes:

a variable displacement compressor, which is driven by the engine, wherein the compressor includes a crank chamber and a cam plate accommodated in the crank chamber, wherein the displacement of the compressor is varied by changing the pressure in the crank chamber, and wherein the compressor, together with the external refrigerant circuit, forms a refrigeration circuit;

a pressure difference detection device for detecting the difference between the pressures at two pressure monitoring points, which are located in the refrigeration circuit, the pressure difference representing the displacement of the compressor;

a control valve having a valve portion and a solenoid, wherein the valve portion automatically adjusts its opening size based on the pressure difference detected by the pressure difference detection device, and wherein the solenoid changes a target pressure difference, which is used as a reference value for adjusting the opening size of the valve portion;

a sensor for outputting a signal that represents the temperature of the passenger compartment; and a temperature adjuster, wherein the engine control apparatus comprises a controller that compares the signal from the sensor with a signal from the temperature adjuster, wherein, when the signals indicate a discrepancy, the controller sets a target pressure difference and sends a target pressure difference signal, which is based on the target pressure difference, to the solenoid such that the control valve operates at the target pressure difference, wherein the controller computes the torque for driving the compressor based on the target pressure difference signal and determines a target engine torque based on the compressor driving torque, and wherein the controller controls the engine based on the target engine torque.

2. The engine control apparatus according to claim 1, wherein the sensor is a first sensor, and the engine control apparatus further comprises a second sensor for outputting an electric signal corresponding to the speed of the engine, wherein the controller computes the flow rate of refrigerant in the refrigeration circuit based on the target pressure difference signal and divides the flow rate by the speed of the compressor, which is computed based on a signal from the second sensor, thereby computing the amount of refrigerant discharged by the compressor per rotation, and wherein the controller computes the compressor driving torque based on the computed amount of discharged refrigerant per rotation.

3. The engine control apparatus according to claim 2, further comprising a third sensor for outputting an electric signal representing the depression degree of an acceleration pedal, wherein the controller determines a horsepower demand of the engine based on the signal from the third sensor and determines a required engine torque based on the horsepower demand and the signal from the second sensor, and wherein the controller adds the compressor driving torque to the required engine torque for computing the target engine torque.

4. The engine control apparatus according to claim 2, further comprising a third sensor for outputting an electric signal representing the depression degree of an acceleration pedal, wherein the controller determines a horsepower demand of the engine based on the signal from the third sensor and determines a required engine torque based on the horsepower demand and the signal from the second sensor, and wherein the controller adds the compressor driving torque and a driving torque of devices that are driven by the engine other than the compressor to the required engine torque for computing the target engine torque.

5. The engine control apparatus according to claim 4, wherein the controller controls the engine to generates a torque that corresponds to the target engine torque such that the amount of intake air of the engine corresponds to the target engine torque, wherein the controller determines a target value of the engine speed based on the target engine torque referring to an optimum fuel economy relationship and computes a target reduction ratio of a continuously variable transmission based on the target engine speed and the current vehicle speed, and wherein the controller controls the transmission to operate at the target reduction ratio.

* * * * *